(12) United States Patent
O'Kennedy et al.

(10) Patent No.: US 9,921,894 B1
(45) Date of Patent: Mar. 20, 2018

(54) EXTENSIBLE SINGLE POINT ORCHESTRATION SYSTEM FOR APPLICATION PROGRAM INTERFACES

(71) Applicant: Accenture Global Solutions Limited, Dublin (IE)

(72) Inventors: Steven O'Kennedy, Dublin (IE); James Daniel Dickerson, Earlsfield (GB); Jeremy Light, London (GB); Bogumil Swiecki, Dublin (IE); Ian James Harris, Dublin (IE); Amit K Mallick, Hook (GB)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/683,761

(22) Filed: Aug. 22, 2017

Related U.S. Application Data

(63) Continuation of application No. 15/659,421, filed on Jul. 25, 2017.

(60) Provisional application No. 62/473,194, filed on Mar. 17, 2017.

(51) Int. Cl.
| | |
|---|---|
| *G06F 3/00* | (2006.01) |
| *G06F 9/44* | (2018.01) |
| *G06F 9/46* | (2006.01) |
| *G06F 13/00* | (2006.01) |
| *G06F 9/54* | (2006.01) |

(52) U.S. Cl.
CPC .................................. *G06F 9/547* (2013.01)

(58) Field of Classification Search
None
See application file for complete search history.

(56) References Cited

U.S. PATENT DOCUMENTS

| | | | | |
|---|---|---|---|---|
| 9,836,339 | B1* | 12/2017 | Engers | G06F 9/547 |
| 2008/0082986 | A1* | 4/2008 | Cheenath | G06F 9/547 |
| | | | | 719/313 |
| 2016/0057107 | A1* | 2/2016 | Call | H04L 63/02 |
| | | | | 726/11 |

* cited by examiner

*Primary Examiner* — Craig Dorais
(74) *Attorney, Agent, or Firm* — Brinks Gilson & Lione

(57) ABSTRACT

An extensible single point orchestration system receives service requests from applications. In dependence upon the service request a single third party provider service or multiple third party provider services is identified. When the single third party provider service is identified, the system dynamically adapts a core capability service, using a stored configuration entity, so as to set an appropriate message format and transmit a service call message to an external API of the identified single third party provider service. When multiple third party provider services are identified, the system dynamically adapts the core capability service, using another stored configuration entity, so as to set a respective appropriate message format for parallel data transmission of service call messages to each of the respective identified third party provider services and transmits the service call messages to respective external APIs of each of the third party provider services.

20 Claims, 8 Drawing Sheets

EXTENSIBLE SINGLE POINT ORCHESTRATION SYSTEM FOR APPLICATION PROGRAM INTERFACES

PRIORITY

This application is a continuation of U.S. patent application Ser. No. 15/659,421 filed Jul. 25, 2017, which claims the benefit of priority of U.S. Provisional Application No. 62/473,194 filed Mar. 17, 2017, both of which are hereby incorporated by reference in their entirety.

TECHNICAL FIELD

This disclosure relates to application program interfaces, and more particularly, to an extensible single point orchestration system for application program interfaces.

BACKGROUND

Digital products and services are increasingly interconnected, delivering seamless experiences to end-users. One method of delivering this interconnectivity globally is with Application Program Interfaces (APIs), which are typically a set of routines, protocols and tools that determine how two software components interact with each other. Developers spend significant amounts of time sourcing and building relationship with API providers and will do so even more as the market for API usage grows ever larger. There is a need for systems and methods to reduce this administrative overhead.

SUMMARY

An extensible single point orchestration system for application program interfaces (APIs) provides a platform to consolidate, aggregate and simplify APIs, from API providers, such as from financial institutions and other digital delivery services. The system provides a platform with a collection of APIs in a single place to dramatically reduce the development overhead associated with building API driven propositions.

The system enables an intelligent, configuration based approach to managing the centralized consumption of API products from multiple sources. Historically it has been easy to create a solution that aggregates or selects over a small set of similar APIs by building services or components that physically implement logic to do the aggregation (calling many services but producing a single set of results) or selection (choosing a specific service out a large group of similar services based on a set of criteria). However, this becomes increasing unwieldy to manage, maintain and grow as the number of services increases or the services vary in form (e.g. number/style of inputs or output formats). It is also very difficult, time consuming and expensive to deal with downstream changes to APIs being aggregated over as well as to add new services to the pool and often requires code releases or similar release management processes to maintain a stable and working system.

The extensible single point orchestration system solves this problem by allowing a layered, stateless, configuration-based approach to the management of API services, which enable aggregation, selection and proxy services with centralized key management capabilities that can be quickly and efficiently modified, extended and maintained via run-time modifiable stored configuration entities.

Other systems, methods, features and advantages will be, or will become, apparent to one with skill in the art upon examination of the following figures and detailed description. It is intended that all such additional systems, methods, features and advantages be included within this description, be within the scope of the invention, and the following claims.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

Figure 1:
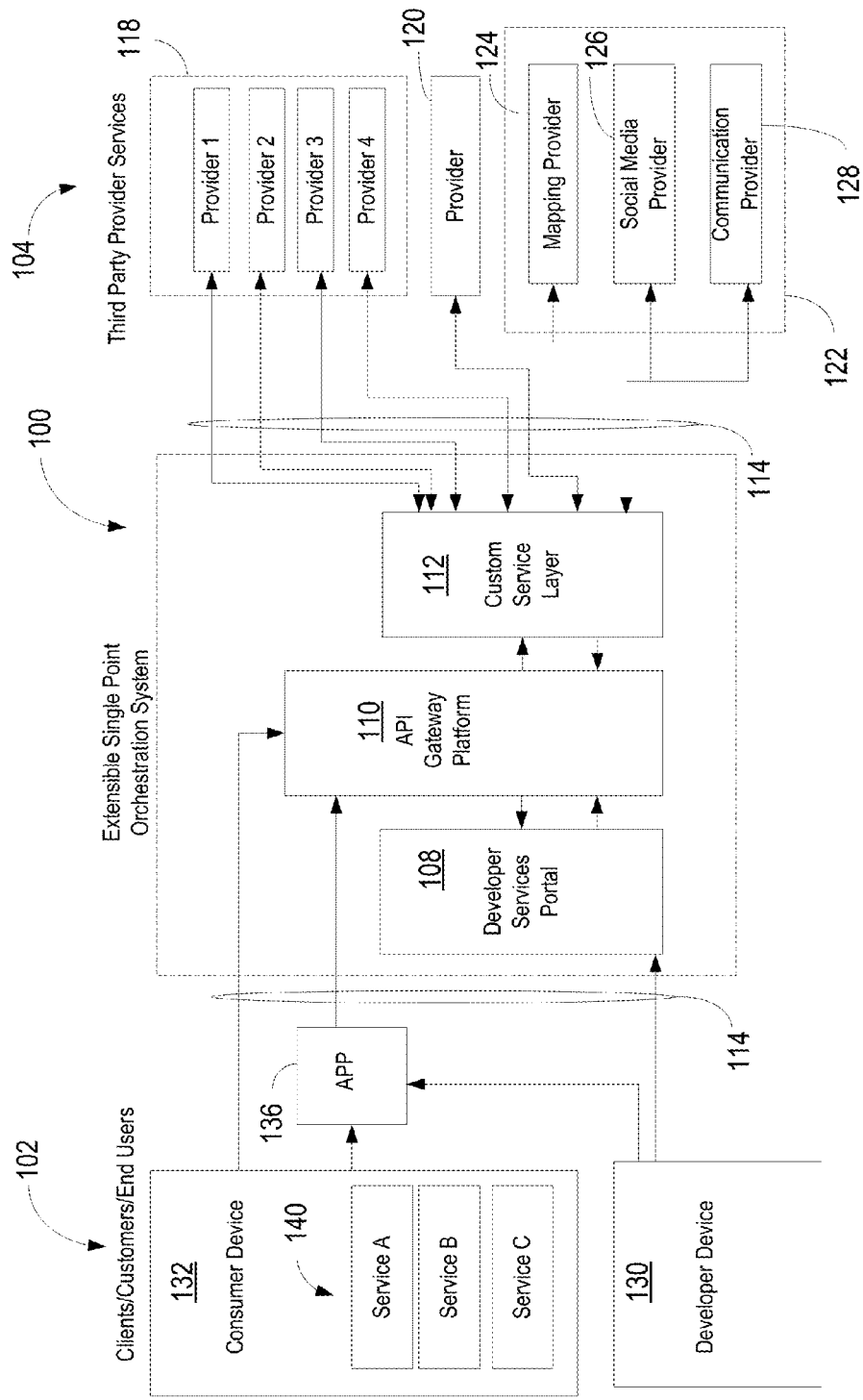
FIG. 1 is a block diagram illustrating an example of an extensible single point orchestration system for application program interfaces (APIs) in communication with users, such as clients and customers, and third party providers.

FIG. 1 is a block diagram illustrating an example of an extensible single point orchestration system for APIs 100 in communication with user devices 102 being operated by users such as end users and developers, and also in communication with third party provider services 104, which may include providers of goods and/or services. The extensible single point orchestration system 100 may include a developer services portal 108, an API gateway platform 110, and a custom service layer 112. The system 100 may be one or more computer servers, computers or other form of computing device, circuitry or other hardware, which may be executing logic. The system 100 may include one or more processors executing instructions stored in memory and accessing and storing data in memory. The system 100 may communicate over wireless or wireline networks 114 with user devices 102 and the third party provider services 104.

The system 100 may consolidate and orchestrate APIs from a variety of third party provider services 104, such as financial and non-financial sources, accessible from a developer portal. The third party provider services 104 may include APIs from one or more groups of competing service providers 118 operating as competitors providing goods and/or services, such as banks, restaurants, gas stations, retailers or other providers of goods and services in a similar field. The third party provider services 104 may also include credentialed individual services provided by service providers 120, such as a user's bank or financial institution where the user has an account and are provided personalized services only after being separately authenticated by the respective third party provider service. In addition, third party provider services 104 may include APIs from any number of account service providers 122, such as mapping providers 124, social media providers 126, and communication providers 128 or other non-financial providers where users have an account and can log in for access. APIs of the groups of competing service providers 118, credentialed individual service providers 120, and account service providers 122 may be processed by the custom service layer 112 included in the system 100. API endpoints of the different third party provider services may be provided to user devices 102, such as developer devices 130, via the developer services portal 108.

The extensible single point orchestration system 100 includes core system components of: 1) the developer services portal 108; 2) the API gateway platform 110; and 3) the custom service layer 112. The system 100 may include security and authentication functionality to secure the system, authenticate users/developers and provide varying levels of access to the system based on security credentials of the users/developers. In other examples, the functionality of the extensible single point orchestration system 100 described herein may be depicted with fewer or greater numbers of core system components.

The developer services portal 108 and API gateway platform 110 may contain or display usage analytics and key management information for the system 100. In addition, the developer services portal 108 may be the entry point for external users, which are developers using the developer devices 130 to access the platform. Thus, the developer services portal 108 may provide an access portal for developer users with elements of functionality exposed from the API gateway platform 110, e.g. API endpoints. Further, the developer services portal 108 may provide the ability for developers using developer devices 130 to register applications 136 and select product bundles of groups of APIs of third party provider services used by respective applications 136 developed by a respective developer. In addition, other information and functionality such as API documents, analytics and developer services utilities may be available within the developer services portal 108. The developer services portal 108 may also provide a user interface, such as a graphical user interface, providing access to the functionality and information in the system 100.

Access to the system 100 via the developer services portal 108 may be with a developer device 130 via one or more wireless and/or wireline networks 114 (herein after network 114). In addition, access to an application 136 or to the API gateway platform 110 by consumer devices 132 may be via the network 114. The network 114 may include the internet, public or private LAN or WAN or any other linked communication system that allows electronic communication. The developer device(s) 130 and consumer device(s) 132 may be hardware such as a computer, a mobile device or a terminal used to access the system 100 over the network 114. In the example of FIG. 1, the consumer device(s) 132 may be a mobile terminal or other computing device upon which the application 136 is executed so that a consumer using the consumer device 132 may access a number of different services of the third party provider services 104. In addition, or alternatively, the consumer device 132 may access the application 136 directly via, for example, a web browser, consumer tools, or some other mechanism executed on a computer (physical or virtual). The developer device 130 may access the developer services portal 108 directly via, for example, a web browser, developer tools, or some other mechanism executed on a computer (physical or virtual). Access to the system 100 by users and developers may involve login, tokens, keys and/or any other form of authentication and security. In an example, the application 136 may pass a developer API key and secret to the system 100 as verification and authentication for use of the system 100.

The API gateway platform 110 may operate as an API gateway itself as well as providing an administrative interface into the setup of the extensible single point orchestration system 100. The API gateway platform 110 may execute logic, such as proprietary code to perform API management functions described herein. In addition, the API gateway platform 110 may include functionality similar to, for example, IBM API Connect™ Amazon™ AWS™, Apigee™ Mulesoft™, or other API management solutions. The API gateway platform 110 may be where API proxies are configured for the applications 136, as well as providing access to analytics, monitoring and security setup. In an example configuration, the API gateway platform 110 may include API proxies for PSD 2 (revised payment service directive), and CMA (Competition and Markets Authority) for an application 136 related to financial transactions. In other examples, any number of additional API proxies may be included in the API gateway platform 110 for any number of different applications 136. The system 100 may provide a wide range of functionality including the ability to embed the actual service logic itself inside the API gateway platform, alternatively, or in addition, the platform may provide for the separation of the main business logic and code elements away from the API configuration itself in a dedicated service layer, such as the custom service layer 112.

A dedicated service layer in the form of the custom service layer 112 may be provided for at least two main reasons: firstly to maintain a good separation of concerns, and to allow for a more decoupled design, and secondly to allow for different elements to scale independently of one another. The separation of concerns may also shield against the possibility of using different implementation components/technologies at the different layers, such as, for example, writing individual service components with other technologies, or at some point moving to another API Gateway product. Allowing different elements to be scaled independently of one another, may avoid, for example, having to scale the platform as a single monolithic application, and/or may allow for different services to be scaled up at different times to different levels. Communication between the custom service layer 112 and the third party provider services 104, as well as communication between the API gateway platform 110 and the third party provider services 104 may be over the network 114.

Figure 2:
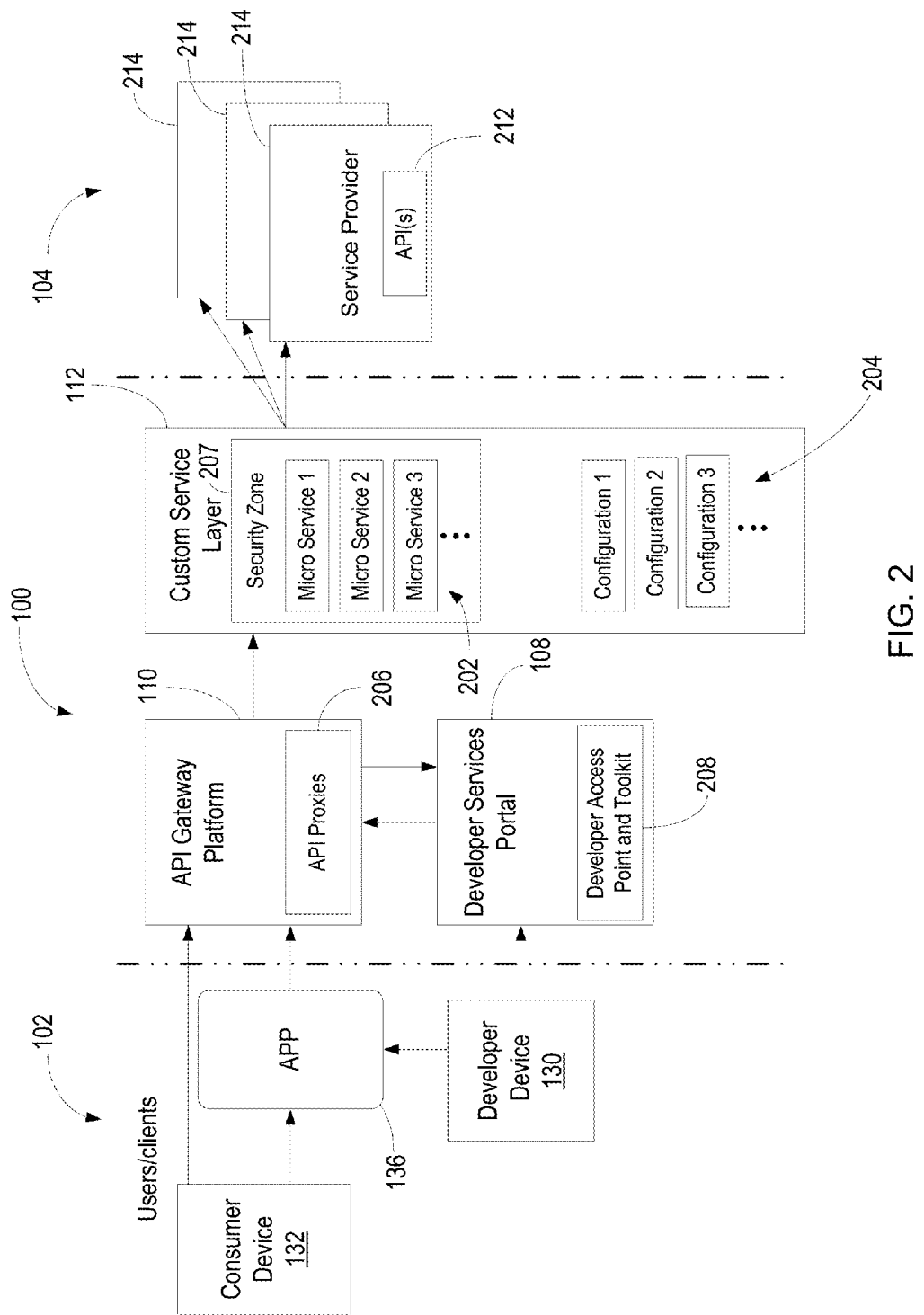
FIG. 2 is a block diagram example, illustrating functionality of the developer service portal, the API gateway platform and the custom service layer within the extensible single point orchestration system.

FIG. 2 is a block diagram example of the system 100, illustrating functionality of the developer service portal 108, the API gateway platform 110 and the custom service layer 112. The custom service layer 112 may include circuitry providing the implementation of the individual services that may be used to house the logic to provide the services to end users, such as consumers 108. The custom service layer 112 may be a collection of micro services and utilities for each of the available services, which may be run within a containerized environment that allows for the native ability to scale out horizontally on a service by service basis and to provide native load balancing between different instances of the same service. Alternatively, or in addition, at least some of the micro services may be run directly on computer servers (virtual or physical).

The custom service layer 112 may include a set of micro services 202, such as micro services implemented in node.js or other technologies. The micro services 202 may use configuration entities 204, such as Json files or XML files or similar representations, as inputs to provide the core logic, transformations, mapping and key handling components of the system 100. Each of any number of API proxies 206 defined in the API Gateway platform 110 for respective applications 136 may be backed or supported by a corresponding micro service 202 or chain of micro services providing the implementation logic for the service being provided. The micro services 202 may be individually and separately executed in a security zone 207 as micro service 1, micro service 2, etc. In an example configuration, two or more different security zones, security regions, jurisdictions, or other forms of container system(s) may be operated within which the micro services may be executed. In some examples, the micro services may be duplicated in the different security zones, such as in different countries. In addition, or alternatively, the micro services may executed in a sandbox to maintain security, confidentiality, and separation of the corresponding data being handled in a restricted operating system environment provided by the sandbox(es).

In an example, the system 100 may provide a predetermined type of services to an application 136 such as a banking application implementing a Payment Services Directive 2 (PSD2), by execution of a micro service (micro service 1) to make calls to multiple different external API's 212 of a group of service providers 214 who are competing service providers 118 (FIG. 1). For example, the banking application may be an ATM locater application. In another example, the system 100 may provide a different predetermined type of services to an application 136 such as an application for a certified management accountant (CMA) by execution of a micro service (micro service 2). In still another example, the system 100 may provide yet another different type of services to an application 136 by execution of a micro service (micro service 3) to provide API key management independently, or in conjunction with other predetermined services. In other examples, execution of any number of other micro services may be included to support the functionality of the extensible single point orchestration system 100 to provide any number of additional different types of predetermined services.

In an example configuration, the services provided using the extensible single point orchestration system 100 may be functionally divided into four different service types or types of services, which may also be described as core services:

Aggregation Services These may be core services that provide a single unified entry point for consumer device 132 to access a consolidated, aggregated response from multiple service providers 214. Following receipt of a service request from an application 136 being executed by a user using the consumer device 132, the aggregation services may be adapted by a configuration entity 204 so that request parameters included in the service request may be sent as respective API service calls to a number of different applicable sources from among the service providers 214 providing external APIs 212. In addition, responses from the external APIs 212 of the applicable sources from among the service providers 214 may be consolidated into a single response by the adapted aggregation services. For example, aggregation type services may be provided by micro service 1 after micro service 1 is dynamically adapted with configuration entity 1. In this example, once dynamically adapted by the configuration entity 1, micro service 1 may be configured to enable the aggregation services to make independent calls to a number of different external API's 212 representing multiple different service provider sources 214 from which different responses may be received and aggregated by the aggregation services using micro services 1 in its adapted state.

Selection Services

These may be core services that provide a single unified entry point for consumers to use an application 136 to access one of a selection of available external APIs 212 being exposed from multiple sources among the third party provider services 214. Following receipt of a service request from a user for a particular service, the request parameters may be interrogated by the selection service to determine the desired final target of the request. The selection service may use a configuration entity 204 to not only determine which request parameters to use, but also to dynamically adapt the selection service to make this determination. The request may then be sent through to the external API 212 of a single specific target service provider 214, which is determined based on the integration of the request parameters into an API service call message generated using the adapted selection service. For example, selection type services may be provided by micro service 2 after micro service 2 is dynamically adapted with configuration entity 2. In this example, once dynamically adapted by the configuration entity 2, micro service 2 may be configured to enable the selection service to call the external API 212 of the single specific target service provider 214 and receive a using micro services 2 in its adapted state.

Key Management Services

These may be core services that facilitate service requests being proxied through the system 100. The key management services may provide unified developer/application API key management capabilities transparently to a requesting application. The key management services may be provided by the custom service layer 112 to the API gateway platform 110. In general, the key management services may be invoked whenever a third party external API 212 being called requires an API key. At the time a developer adds a new third party API 212 as a capability to the developer's application 136, the key management services may transparently and automatically create an account for the developer with the third party provider service 104 and obtain a sub-key that is associated by the key management service with the developer's application 136 for use in calling the new third party API 212. A user input to an application 136 may result in the application 136 making a service request to the system 100. The system 100, in response to the service request may generate and transmit API service call message(s) to third party API(s) that require an API key. As part of generation and transmission of the API service call message(s) the key management services may be used independently, or with the aggregation services, or with the selection services to expose one or more API products that require respective sub-keys. For example, key management type services may be provided by micro service 3. In this example, micro service 3 may be configured to enable the key management service to cooperatively operate with the aggregation services or the selection service, or independently to manage API keys for a respective application.

Utility Services

To provide some of the generic capabilities used by the three above-described service types (Core Services), e.g.

aggregation, selection, key management, additional utility services may be available as a fourth core service type. The utility services may be called by the core services along with necessary parameters that allow the generic services to be specifically tailored for a given request from a user/client. One such core service is a configuration look up service that accesses the configuration entities 204.

In FIG. 2, users/clients may use a consumer device 132 to execute an application 136, such as a smartphone executing a smartphone application to communicate with, for example, API proxies 206 included in the API Gateway Platform 110. In addition, or alternatively, end users may use a consumer device 132 to communicate with the API gateway platform 110. In addition, developers may use a developer device 130 to communicate with a Developer Access Point and Toolkit 208 included in the Developer services portal 108. The API gateway platform 110 and the Developer Access Point and Toolkit 208 may bi-directionally communicate during access to the developer services portal 108 by the developer device 130. The developer services portal 108 may request information from the API gateway platform 110, such as a request to render an analytics screen for an application, or the API gateway platform 110 may push information to the developer services portal 208. Information may be pushed to the developer services portal 108, for example, in response to administrative changes to an application 136, such as deployment of new API proxies 206 by the developer.

In addition, the API Gateway Platform 110 may communicate with the custom service layer 112 to access core capability services and/or utilities. The custom service layer 112 may selectively communicate with external APIs 212 of downstream third party provider services 104. Each of a plurality of different third party providers 214 may individually and independently communicate with the custom service layer 112 or the API gateway platform 110. In other examples, the functionality of the services as described herein may be divided into fewer or additional service types.

The core technologies used to power this capability may be housed within the design and implementation of the custom service layer 112 of the system 100. The aim of the extensible single point orchestration system 100 is to provide a generic mechanism that allows for the creation and servicing of at least three categorical styles of APIs present within the service providers 214, namely:

Aggregation-style APIs—may be a category or style of APIs where existing services are being provided by external APIs 212 from multiple API providers 214 selected from among the third party provider services 104, such as the competing service providers 118 (FIG. 1) based on the nature or context of the request. The multiple API providers 214 may be selected based on providing similar services, such as a plurality of travel services providers identified as being capable of responding to a request related to travel. The respective APIs 212 of the selected API providers 214 may have different API end-point configurations and possibly with differing implementations (e.g. input parameters, output format etc.) that provide a common set of functionality/data that is of more value and relevance when combined across the selected API providers 214. Examples include:
  a. bank branch location APIs provided by multiple different banks.
  b. hotel booking and price information APIs provided by multiple different hotel chains.
  c. Flight time information APIs provided by multiple different airlines.

Selection-style APIs—may be a category or style of API that is called where the API consumer (user/client) desires to perform an operation with only one of the API providers 214, such as credentialed individual services service providers 120 (FIG. 1). The selection-style APIs may be from service providers 104 capable of providing similar or unrelated services, such as credentialed individual services service providers 120 (FIG. 1). The APIs 212 may be for individual requests, or alternatively may be the same or a similar API to the APIs of the aggregation-style API category. Individual selection of an API 212 of an API provider 214 from the among the third party provider services 104 may be determined by the system 100 via provider specific information passed by the client/user (e.g. input parameters, request headers, security tokens, and/or other information associated with the user/client interaction with the system). In the case of a user request directed to a specific third party provider service, such as a request to access a user's existing account, the specific target API provider 214 and corresponding API 212 associated with the user's account may be identified by the system 100 based on provider specific information associated with the user request. Alternatively, in the case where the request is identified by the system as being to multiple API providers 214, the system 100 may monitor the communication between the user and the multiple API providers 214 to identify provider specific information directed to a specific target API provider 214. In this case, the specific target API provider 214 is not initially selected since the initial request from the user is directed by the system 100 to APIs 212 of multiple API providers 214 (similar to aggregation-style APIs), followed by selection by the system 100 of the specific target API provider 214 and corresponding target API 212 based on provider specific information associated with communication from the user. Examples include:
  a. Payment requests specific to a user's bank.
  b. Renting a car from one of a selection of rental companies by comparing rates within a group of rental car companies and then selecting a single rental car company with which to make a reservation.
  c. Reserving a cinema ticket from one of a selection of cinemas after browsing the movies at the group of cinemas.

Single Key APIs—may be a category or style of APIs that are independently operational and accessible outside the system 100 using an API key, but are seamlessly made available through the extensible single point orchestration system 100 alongside or in addition to APIs that do not require the use of an API key. The system 100 provides single channel access to APIs 212 whether the particular API does, or does not require an API key. This single channel access allows a single view for usage of aggregation services in which APIs being called may or may not have an API key. In addition, selection services, such as single bill/payment for service may be invoked through the same single channel to access APIs that may or may not require an API key. Further, where an application makes a service request for a specific API based on a user input to the application, the system may automatically retrieve and apply an API key to the request where an API key is required to shield the user from the complexities associated with retrieval and submittal of an appropriate API key for a particular service.

Single channel user access to a variety of different APIs may be accomplished using a single developer API security key for any 3rd party APIs 212. A unique developer API security key is associated with each developer who is a user of the system 100. The system 100 may dynamically obtain any number of different security tokens or API keys of 3rd party APIs 212, when such 3rd party APIs 212 are associated with a developer's application. The system 100 may then call APIs 212 of different service providers 214 using a single developer API key even though each of the APIs 212 of different service providers 214 require their own separate API key. This adds significant value to consumers of APIs by greatly simplifying the mechanisms to consume, monitor and pay using a wide range of APIs. Examples include:

a. Social media APIs (e.g. Facebook, Twitter).
 b. Mapping APIs (e.g. Google Maps, Apple Maps).
 c. Communication APIs (text message, phone call, email).

Figure 3:
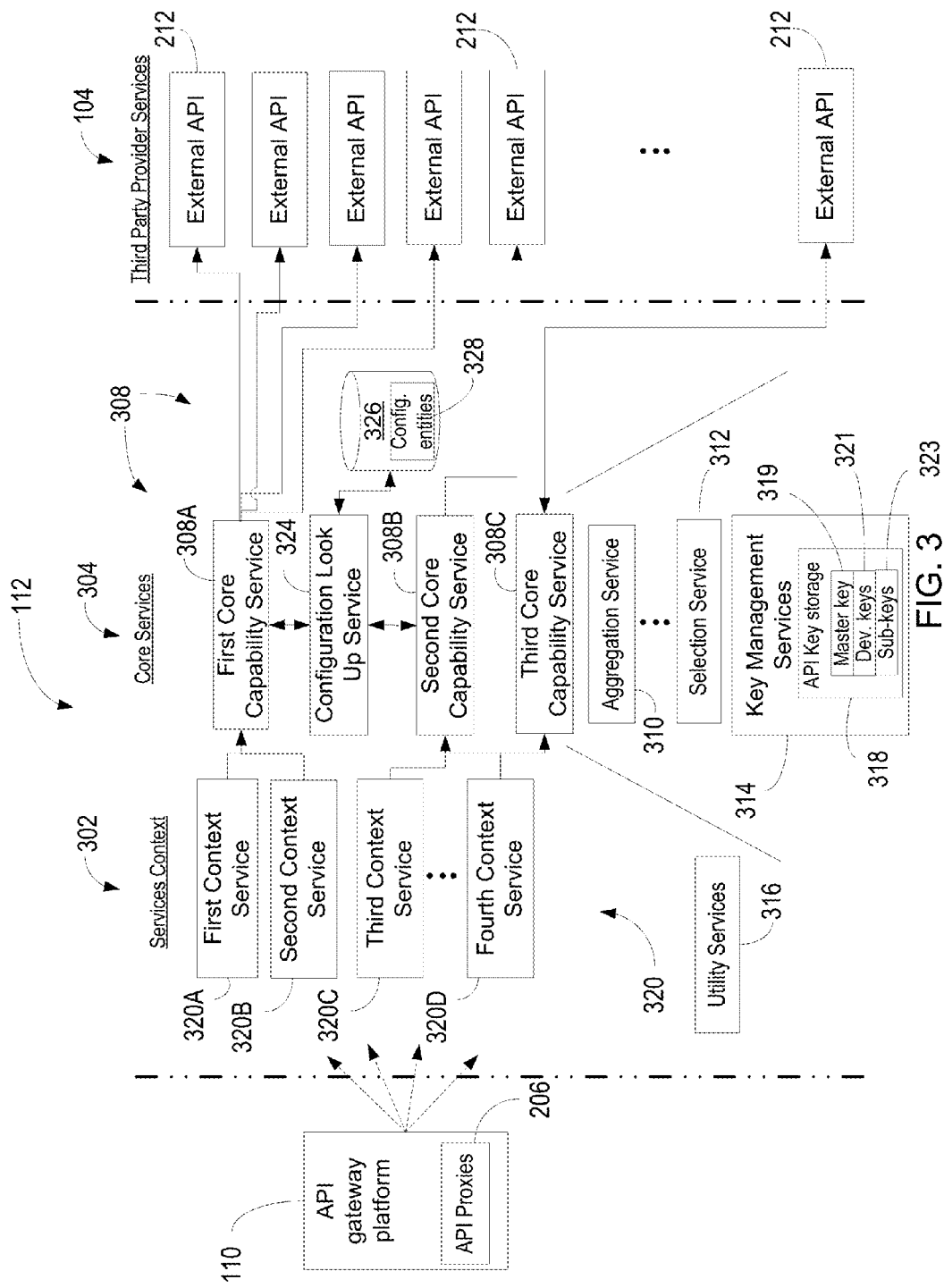
FIG. 3 is a block diagram illustrating an example custom service layer within the extensible single point orchestration system that includes a context layer and a core services layer.

FIG. 3 is a block diagram illustrating an example custom service layer 112 within the extensible single point orchestration system 100 that includes a context layer 302 and a core services layer 304. Also illustrated is the API gateway platform 110 and third party provider services 104 with respective external APIs 212.

The technical mechanism involved in providing the capabilities of the custom service layer 112 differentiates itself by providing a clean segregation between context services provided by the context services layer 302 and core services provided by the core services layer 304, which allows aggregation, selection, key creation/management and other utility services to be handled centrally and statelessly by the core services layer 304 of the system 100 while the knowledge and context of the service being provided is passed in by the services context layer 302.

Any number of core capability services 308 may independently operate in a stateless and generic fashion within the core services layer 304 as types of services. In the example of FIG. 3, a first core capability service 308A, a second core capability service 308B, and a third core capability service 308C are illustrated. The first core capability service 308A may provide, for example, functionality of an aggregation service 310, and the second core capability service 308B may provide, for example, functionality of a selection service 312. In addition, the third core capability service 308C may provide, for example, functionality of the key management service 308C, In other examples, any other functionality may embodied in the first, second, third, etc. core capability services, or functionality may be embodied in different or multiple core capability services. The stateless and generic functionality of the core capability services 308 allows each of the core capability services 308, when adapted with a configuration entity, to perform only one specific type of operation efficiently and reliably. Thus, operation of each of the core capability services 308A, 308B, 308C, . . . , behaves with a profile of a "pure function" in the mathematical sense—i.e. the return value is determined only by the input values provided, with no observable side effects. This means that the core capability services in the core services layer 304 may remain unaware of both the context of the operations that they are performing and the significance of the data that passes through them as either inputs or outputs. This lack of need for awareness within the core capability services 308A, 308B and 308C greatly simplifies design of the services, increasing the maintainability, testability and scalability of the system.

Since each of the core capability services 308 is a stateless and generic functionality, one of any number of different configuration entities may be selectively applied to, or passed to, each of the core capability services 308 to independently and dynamically adapt respective core capability services 308 to communicate with any of a variety of different service providers and their corresponding API(s). Thus, the functionality of a single core capability service 308 may be dynamically adapted by passing a specific stored configuration entity for API specific communication with a first specific API and then differently dynamically adapted by passing a different stored configuration entity for API specific communication with a second specific API with a different communication protocol and/or format than the first specific API.

The key management service 314 provides the capability to seamlessly and automatically associate an API key of an external API 212 with an application at the time a developer of the application first associates the external API with the application. In addition, the key management service 314 may inject an API key into communication between the API gateway 110 and the APIs 212 of the third party provider services 104 in cases where the APIs 212 of the third party provider services 104 require an API key to identify the application calling the respective external API 212. The key management service 314 may be invoked independently, or in conjunction with the aggregation service 310 or the selection service 314. The key management service 314 also provides storage, allocation and management of security related information that allows a respective application to communicate with the APIs 212 of the third party provider services 104.

The key management service 314 may include an API key storage 318, which may be a database, datafile, or some other data storage system stored in memory. Stored within the API key storage 318 may be master keys 319 and any number of developer keys 321. Secrets associated with API keys, tokens, and/or any other security related data may also be stored in the API key storage 318.

Each of the master keys 319 may be API keys used to identify the extensible single point orchestration system to external APIs 212 of respective third party provider services 104. Thus, there may be a master key 319 for each external API 212 called by the system. The master keys 319 may be used by the key management service 314 to obtain sub-keys 323 from third party provider services 104. The master keys 319 may be obtained and stored at the time the extensible single point orchestration system creates respective accounts, and/or otherwise forms relationships with the external API's 212 of third party provider services 104 that require an API key. For example, master keys 319 may be created and stored for those external APIs 212 of the third party provider services 104 that are public upon authorization/onboarding of the extensible single point orchestration system to call the respective public external API 212. In another example, where the third party provider services 104 are private, onboarding of the extensible single point orchestration system to obtain a master key 319 may be via an agreement or other contractually based arrangement such that the extensible single point orchestration system is enabled to call the private external API 212 of the respective private third party provider services 104 using a respective master key 319.

Developer keys 321 may be single system API keys that are uniquely assigned to each respective developer associated with the extensible single point orchestration system. A developer API key 321 of a developer may be a single API key used by that developer in an application being developed by the developer to call all external APIs 212 that require API keys. Thus, the same developer API key 321 may be used by the developer in the developer's application to call any number of different and wholly unrelated external APIs 212. The developer keys 321 are actually not used in calling any external APIs 212. Instead, the developer key 321 of a developer is stored in the API key storage 318 in association with the application developed by the developer and any number of sub-keys for external APIs 212 that are callable from the developer's application.

The sub-keys 323 may be requested by the key management service 314. The key management service 314 may be invoked to automatically and dynamically create and manage new API keys for a corresponding application on behalf of a developer who is first enabling an API 212 of third party provider service 104. In an example, the key management service 314 may monitor for creation of an API proxy in the API gateway platform 110. Upon creation of a new API proxy due to a new API being enabled in the developer's application, the key management service 314 may dynamically and automatically obtain a new corresponding sub-key.

Creation of new API keys for an application may be based on a master key 118. The master key and API keys created by the key management service 314 may be stored in the API key storage 318. API keys may be stored in association with a respective application and an identifier of an API product with which the API key is used. The API keys may be sub-keys obtained using the master key from the third party provider services 104 providing the API product. The key management service 314 may use the master key as authentication and identification of the system to automatically request a sub-key for an application. Upon receiving a request from the key management service 314 for an API key, the third party provider service 104 for the API product may confirm the key management service 314 is authorized to receive a sub-key via the master key. Upon receiving the sub-key generated for the application based on the master key, the sub-key may be automatically mapped to the application and a corresponding association stored in the API key storage 318 by the key management service 314.

Also included in the custom service layer 112 is a set of utility services 316. The utility services 316 may support the other services in the core services layer 304 or provide additional common capabilities, such as caching, request management and the like.

Complementing the core capability services 308A, 308B and 308C within the core services layer 304 are context services 320 in the services context layer 302, which may provide user-facing functionality. In the example of FIG. 3, a first context service 320A, a second context service 320B, a third context service 320C, and a fourth context service 320D are illustrated. In other examples, any number of context services 320 may be present in the custom services layer 112. The context services 320 may be selected by the API gateway platform 110 to act upon a request received by the API gateway platform 110.

The API gateway 110 may provide the logic to route inbound requests to the appropriate API Proxy based on the API endpoint (URL), logic, and/or arguments. The API proxies 206 stored in the API gateway platform 110 may be configured to point at (or be linked with) a particular context service, or alternatively, multiple API proxies 206 may be linked, or associated, with a particular respective context service. Thus, when an API proxy is called, a corresponding context service is selected. For example, an API proxy may be linked to a context service that may identify a service type as aggregation services, another API proxy may be linked to a context service that may identify a service type as selection services, and yet another API proxy may be linked to a context service that may identify a service type as key management services. In an example, each API proxy may be configured to point to a particular respective context service, however, in other examples, multiple API proxies may be configured to link to the same context service such that an identified context service may be selected based on arguments associated with one or more of the API proxies. In alternative examples, multiple API proxies may be linked to multiple context services with logic to select a corresponding context service based on variant parameters.

The selected context service in the services context layer 320 may determine and identify or capture the context of the operation being performed and use the core capability services in the core capability layer 308 as tools to perform work for the selected context service(s) 320A-D. The context services included in the services context layer 320 may receive relatively raw data back from the core capability services 308, and the respective selected context service(s) 320A-D may themselves provide the necessary formatting of the output into the format or formats required to meet the context of the service.

Also included in the core services layer 304 is the configuration look up service 324, which may be included in the utility services 316. The configuration look up service 324 may be used to pass the core instructional, input and output data, between the services context layer 302 and the core services layer 304. The configuration lookup service 324 may be implemented to communicate with a data store 326, such as a memory, a database or other data storage, to provide a mechanism to store and select complex sets of instructions, inputs and outputs that are needed by the generic core capability services 308 and context services 320 based only on simple and easily maintainable configuration entities 328 stored in the data store 326. The stored configuration entities 328 may be selectively applied to the core capability services 308 to dynamically adapt a selected type of core capability service, such as the first core capability service 308A, to perform API specific communications in a format and/or protocol compatible with the external API of a respective third party provider service 104.

Thus, in the case of the type being indicated as for aggregation services 310, the first core capability service 308A may be dynamically configured using a stored configuration entity 328 identified by a context service 320, such as the first context service 320A or the second context service 320B. Following dynamic configuration using the stored configuration entity 328, the core capability service 308A may generate a plurality of different API specific service call messages containing at least some of the input parameters provided by the context services 320A or 320B. In the case of the type being identified by the context service 320C as for selection services 312, a core capability service 308, such as the third core capability service 308C may be dynamically adapted using a different stored configuration entity 328 (which is identified by the context services 320C) to generate an API specific service call containing at least some of the input parameters. The API specific service call may be communicated to only one API 212 of only one of the plurality of different external third party provider services 104 based on the combination of configuration data and input parameter values as described in the corresponding configuration entity 328. Thus, the custom service layer 112 may provide the capability to manage and maintain services that perform complex aggregations (and other operations such as filters) involving multiple external APIs 212 per service call in manner that is much more efficient, safe, testable, reusable and requiring less code than can be achieved using traditional methods.

A portion of an example configuration entity 328 for aggregation services 310 related to locating an automated teller machine (ATM), includes the following for each of the third party provider services 104, which in this example is for third party provider "Bank A":

```
{
"name": "bank A",
"productName": "branch-locator",
"productDefinition": "bank",
"product":{
"baseUrl": "https://openapi.bankA.co.uk/open-banking/v1.2/branches",
"inputVariants":["{?params*}"],
"requestOptions": {
   "headerParams": {
      "Content-Type": "application/json",
      "accept": "text/html, application/json; charset=utf-8, application/xhtml+xml,application/xml;q=0.9,image/webp,*/*;q=0.8"
   },
   "method": "GET"
},
"outputFormat": {
   "data": "data",
   "bankName":
"data[i].Organisation.ParentOrganisation.OrganisationName.LegalName",
   "branchName": "data[i].BranchIdentification",
   "streetAddress": ["data[i].Address.BuildingNumberOrName",
"data[i].Address.StreetName"],
   "town": "data[i].Address.TownName",
   "postCode": "data[i].Address.PostCode",
   "country": "data[i].Address.Country",
   "longitude": "data[i].GeographicLocation.Longitude",
   "latitude": "data[i]. GeographicLocation.Latitude",
   "atmAtBranch": "data[i].ATMAtBranch",
   "telephoneNumber": "data[i].TelephoneNumber",
   "accessibility": "data[i].AccessibilityTypes",
   "openingTimes": "data[i].OpeningTimes"
   }
 }
}
```

An example of a stored configuration entity 328 for selection services 312 to communicate with a single selected third party provider service 104, such as "bluebank" is:

```
{
"name": "bluebank",
"productName": "initiate-payment",
"product": {
"baseUrl": "https://api.us.apiconnect.ibmcloud.com/acit-bluemix-studio-openbankingpsd2/sb/paymentapi/payment",
"inputVariants": ["{?params*}"],
"requestOptions": {
   "headerParams": {
      "accept": "application/json",
      "keys": ["clientsecret"]
   },
   "method": "GET"
},
"outputFormat": { },
"productSpecificConfig": {
   "claims": {
      "paymentinfo": {
         "challenge_type": "SANDBOX_TAN",
         "value": {
            "amount": "{{amount}}",
            "currency": "{{currency}}"
         },
         "to": {
            "remote_name": "{{name}}",
            "remote_IBAN": "{{IBAN}}",
            "account_number": "{{account_number}}",
            "remote_bic": "{{bic}}"
         },
         "additional": {
            "booking_code": "{{booking_code}}",
            "subject": "{{subject}}",
            "booking_date": "{{booking_date}}",
            "value_date": "{{value_date}}"
         },
         "type": "{{type}}"
      }
   },
   "iss": "https://accenture.co.uk",
   "scope": "payment",
   "acr_values": "3",
   "aud": "https://sb-acit-bluemix-studio-openbanking-psd2.developer.us.apiconnect.ibmcloud.com",
   "redirect_uri": "{{redirect_url}}",
   "client_id": "{{client_id}}",
   "state": "2ouMCgSqS0e"
   }
},
"productDefinition": "bank"
}
```

The configuration entities 328 for use by the aggregation services 310 may be different than the configuration files used by the selection services 312. There may be configuration entities 328 for each different aggregation activity. Thus, for example, for aggregation services 310 there may be a stored configuration entity 328 for use to identify locations of bank ATMs of various bank services providers and a different stored configuration entity 328 for use in searching for hotel accommodations at various hotel services providers. The respective context services 320A-D may identify the applicable stored configuration entity 328 for a particular request. Each of the configuration entities 328 for use by the aggregation services 310 may include a list of third party provider services 104, a protocol and/or format for communicating messages, such as service calls, to the respective third party providers APIs 212, and a mapping to interpret and/or reformat (as appropriate) the responses received.

The configuration entities 328 for use by the selection services 312 may similarly include a list of third party provider services 104, a protocol and/or format for communicating messages such as service calls to the respective third party provider's APIs 212, and a mapping to interpret and/or reformat (as appropriate) the responses received. However, the selection services 312 also receives configuration data from the respective configuration entity 328 that allows the selection services 312 to interpret the input parameters and select the relevant target third party service 104. Therefore only a single service call message in a format to a respective API 212 of the target third party provider service 104 is made.

The configuration lookup service 324 may include configuration entities 328 in the data store 322 for any number of different external APIs 212. Each external API 212 may be associated with a different configuration entity 328. For target APIs 212 that expose multiple endpoints to the same service, multiple different stored configuration entities 328 may be included in the configuration lookup service 324. Alternatively, or in addition, the same configuration entity 328 may be used to expose multiple different endpoints. The configuration entities 328 may be stored in a database, a relational database, or some other form of storage where they can be accessed by the aggregation service 310 and the selection service 312 via the configuration lookup service 324. A respective configuration entity 328 may be accessed by the aggregation service 310 or the selection service 312 in response to receipt of an API service call request, and in response to a return of information from the API 212 in a response to the API service call request.

The aggregation service 310 and the selection service 312 included within the core services as the first capability service 308A and the second core capability service 308B are not API specific and may use the different stored configuration entities 328 to dynamically adapt to provide different sets of instructions and execution parameters regarding what to do with requests received from the context service 320 A-D in the services context layer 302 and how to send back responses to the context services 320 A-D. In addition to indicating whether the aggregation service 310 or the selection service 312 should be used for a particular request, the stored configuration entities 328 may also include input parameters for use with a particular request and response. Input parameters may be provided as arguments to an API service call message, and may include, for example, identification of end points in a given target API, input parameters a given target API requires, and/or mapping of target API output parameters to parameters within the system. In addition to one-to-one mapping between parameters, the mapping included in the stored configuration entities 328 may also include transformations of parameters. For example, three parameters, such as addresses, provided from a target API may be mapped to a single output parameter, such as an address, provided by the system.

A target API might expose any number of different end points to the same service that use different parameters. In these situations, information may be included in the stored configuration entities 328 such that the input parameters may be used by the core services to select the most appropriate end points to call in order to get back the desired information.

The stored configuration entities 328 may include mapping of input parameters to selected input variants. In addition, when inputs are provided back from a target API in a response, the core capability services 308 may use the respective configuration entity 328 to determine which parameters to extract based on the mapping. The core capability services 308 may provide extracted parameters as raw output data to a respective context service 320A-D, where the raw output date may be formatted.

Figure 4:
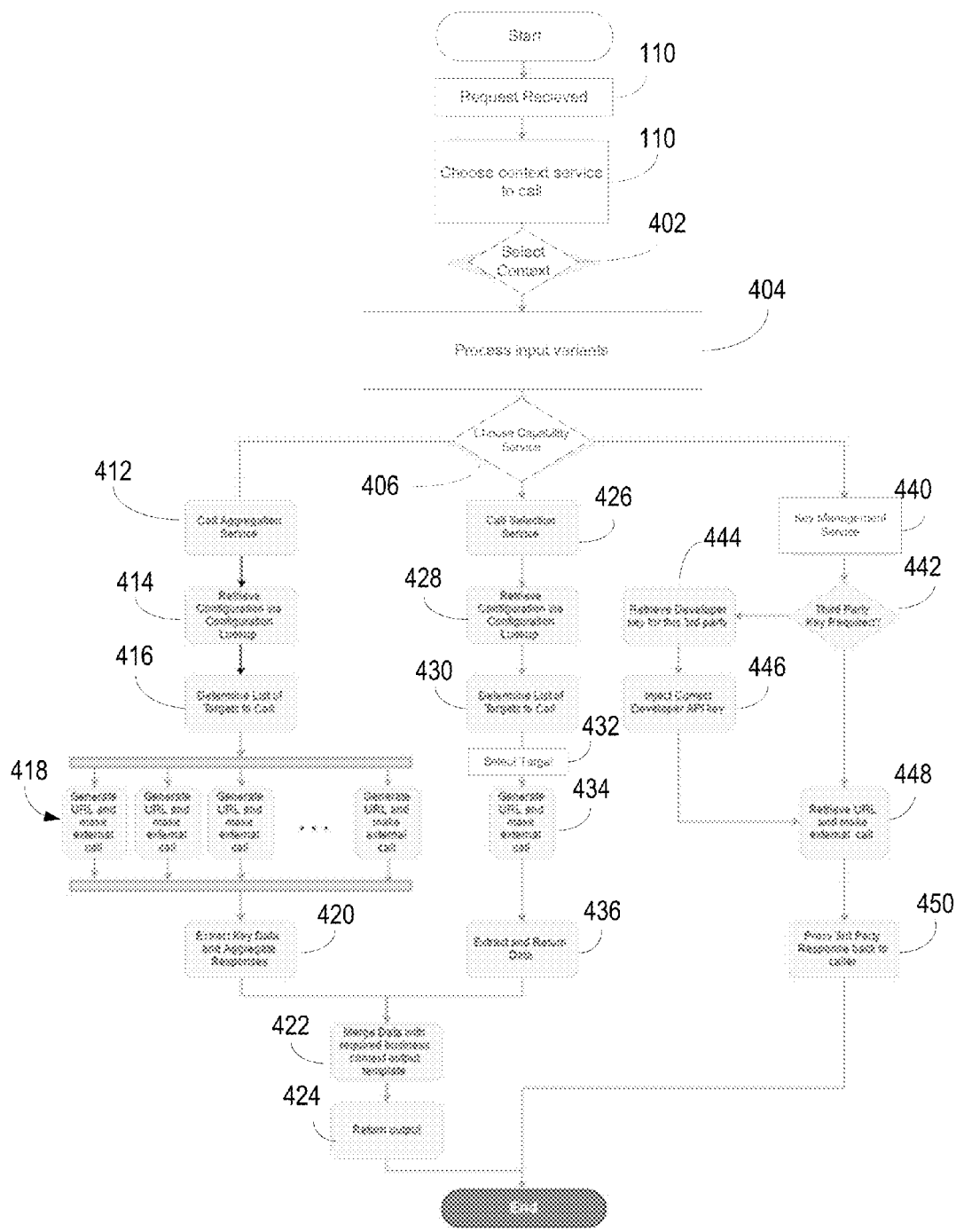
FIG. 4 is a flow diagram of example operation of the communication process between the context services and the core capability services.

FIG. 4 is a flow diagram of example operation of the communication process between the context services 320A-D and the core capability services 308A-C, described with reference to FIG. 3. In this example, core capability services 308 may include the functionality of aggregation services 310 as first core capability service 308A, the functionality of selection services 312 as second core capability services 308B, and the functionality of key management services 314 as third core capability services 308C.

During operation, API gateway 110 may receive a request from an application being executed by a user (402). The API gateway 110 may select one of the context services 320 to operate upon the request, and allocate the request to the selected one of the context services 320, such as the first context service 320A. (404) The first context service 320A may parse the request and identify a type of the core capability services 308 in the core services layer 304 that is capable of handling or processing the request. (406) Since each of the core capability services 308 perform only one specific type of operation, the first context services 320A may determine a context of the request in order to identify the one specific type of operation capable of satisfying the request. The first context service 320A may extract parameters from the request in order to determine the context of the request. For example, the first context service 320A may determine that the nature of the request is such that aggregation services 310 are needed, and the first core capability service 308A may be selected.

The first context service 320A may parse the request and pass to the core services layer 304 an identifier of one of a plurality of stored configuration entities 328, a plurality of parameters, and a service type indication. (408) The identifier may be a unique identifier of a configuration entity 328 stored in the data store 326. The parameters may be input values, which are extracted from the request and provided to the core services layer 304. Alternatively, or in addition, the parameters may be input values derived by the first context service 320A. For example, the context service layer 320A may aggregate different variants included in the request, convert a variant included in the request to a desired format and/or logically create an input parameter based on the variants extracted from the request. The request passed to the core services layer 304 may pass through a set of necessary instructions, along with any source input parameters from the request. In addition, the service type indication may be generated by the first context service 320A and passed to identify the specific core capability service, for example the aggregation service 310 or the selection service 312, and/or the key management service 314 to further process the request. The first context service 320A may choose one or more of the core capability services from the core capability services layer 304. In an example, the core capabilities services may be intrinsically linked with the functionality being exposed by the first context service 320A. Thus, for example, if the functionality exposed by the first context service 320A is for aggregation services 310 and key management services 314, the first core capability service 308A may be dynamically adapted accordingly using a respective configuration entity 328 identified by the first context service 320A since the first core capability service 308A intrinsically includes functionality to perform aggregation services 310 and key management services 314. In addition, or alternatively, the first context service 320A may choose one or more of the core capability services by evaluating the request to determine or anticipate the type of response being sought and choose core capabilities service(s) 304 and a corresponding configuration entity(s) accordingly. (410) In this example operation, the service type indication may indicate the aggregation service 310, which is core capability service 308A resulting in the aggregation service 310 being called. (412)

The aggregation service 310 may provide the ability to make multiple parallel requests to multiple targets (third party APIs 212) and to extract a common set of data requirements from the outputs the third parties 104 return. The aggregation service 310 may take as an input the location in the data store 326 of a configuration entity 328, which the aggregation service 310 may retrieve using the configuration lookup service 324. (414) The configuration entity 328 may contain:
  a list of external third party services that the Aggregation Service should aggregate over;
  a list of supported inputs that the first context service 320A exposes;

a list of the required output fields to return to the application of the user/client; and for each external third party service target:
different valid URL protocol variants provided by each of the external service providers that the first core capability service 308A is supporting;

mapping information for inputs of the extensible single point orchestration system to the external service provider's inputs; and a mechanism to extract each of the required outputs from the external providers service response.

The aggregation service 310 may use the configuration entity 328 to determine the list of URLs that may be possible messages to call for each service, and dynamically selects the most appropriate one based on the inputs parameters provided by the calling first context service 320A. (416) The configuration entity 328 may be effectively static and eminently cacheable, allowing overhead on the overall performance of the aggregated API call messages to be minimal.

The external services may be called with parallel API call messages and information in response messages may be aggregated (subject to configurable timeouts) as the results arrive back to the first core capability service 308A. (418) The aggregation service 310 may extract the required data from each response and return the extracted data as part of a unified, raw data structure to the calling first context service 320A. (420) The first context service 320A may merge and format the output data as needed. (422) In addition, the first context service 320A may return as a response to the request the formatted output data. (424)

The core capability service chosen and called by the context service 320 may also be the selection service 312 (for example second core capability service 308B) by identifying the service type indication as selection services. (426) The selection services 312 may work in a broadly similar way to the aggregation services 310 to retrieve a configuration entity 328 identified by the context service 320, in this example the third context service 320C, via the configuration look up service 324. (428) In addition, the selection services 312 may determine a target list of possible third party provider services 104 from the configuration entity 328 that may be able to satisfy the request. (430)

From the list of possible third party provider services 104, the selection services 312 may identify a target third party provider service 104. (432) The target third party provider service 104 may be identified as the only API 212 to which an API service call message is directed. The target third party provider service 104 may be chosen by the selection services 312 based on, for example, on input parameters received from the application and a configuration entity 328, which provides the basis on which to make the evaluation. For example, the configuration entity 328 may indicate the specific parameter(s) to use to make the selection of the target third party provider service, and how the selection services 312 should interpret the provided input parameters to make the selection. The parameters provided may include an account number, the name of the target third party provider service, security information of the target third party provider, an identifier of the external API 212 of the target third party provider service 104, or some other item of information that the selection service 312 can use to identify the target third party provider service 104 from among the list of possible third party provider services 104. In another example, the third context service 320C may identify which service provider to select as the target third party provider service from a list of available options. In this example, identification/selection of the target third party provider service 104 by the context service 320 may be based on input parameters received from the application and a configuration entity 328.

As a result of choosing only one third party provider service 104, instead of sending out many parallel requests to a group of external third party services 104, as is performed with the aggregation services 310, the selection services 312 may send out only one API service call message to only one API 212. Similar to the aggregation service 310, the configuration lookup service 324 may provide the mechanism in the form of a configuration entity 328 to allow a third context service 320C to inject information into the selection service 312 to dynamically adapt the selection service 312 to behave completely generically while performing specific formatting of an API service call message to a specific API 212. The configuration entities 328 for the selection services 312 may provide:

The field or combination of fields from the input parameters that should be used to select the target third party provider service 104;

a list of the possible third party provider service targets for selection;

a list of supported inputs that the context service exposes;

a list of the required output fields to return to the user/client;

and for each external third party service target:
the different valid URL protocol variants provided by each of the external services supported by the selection services 312;

mapping information for extensible single point orchestration system inputs to the external third party services' inputs; and a mechanism to extract each of the required outputs from the external service response from the selected target third party provider.

Similarly, to the aggregation service 310, the selection service 312 may rely on the respective third context service 320C to provide the necessary inputs and a reference to the stored configuration entity 328 to use and returns the raw data it has gathered. The third context service 320C may be responsible for taking that data and defining the appropriate output format in which to return the data. (422) In addition, the third context service 320C may return, as a response to the request, the formatted output data. (424)

The core capability service chosen and called by the context service 320 may also be the key management service 314 by identifying the service type indication as key management services. (440) The key management service 314 may operate as a proxy service for third party provider services 104. In this capacity, the key management service 314 may pass information between external APIs 212 of third party provider services 104 and the API gateway platform 110, which is in communication with an application 136 being executed by a consumer device 132 as illustrated in FIG. 1. The key management service 314 may provide core capabilities that allow for the proxying of third party APIs through the custom service layer 112 when the third party APIs require a security key (or public key) in order to respond to a request.

Referring to FIGS. 1-3, one of the drawbacks to using external APIs 212 exposed from multiple service provider services 104 in an application 136 may be the necessity to create an account and a developer API key with each third party provider service 104 and/or external API 212 which the application 136 will use. In addition, management of these accounts and corresponding keys within the application being developed or executed may be challenging for developers. Thus, a first capability of the key management services 314 may be to allow the automated, dynamic creation and management of new keys for third party external APIs 212 of respective third party provider services 104. New keys may be created at a time when a developer of an application 136 first associates a third party external API 212 with the application 136 being developed with the developer services portal 108 (FIG. 1). In addition to keys, the functionality described for the key management service 314 may similarly be used for passwords, tokens, or any other authentication or security mechanisms related to API service calls to the external APIs 212 by the application 136.

Figure 5:
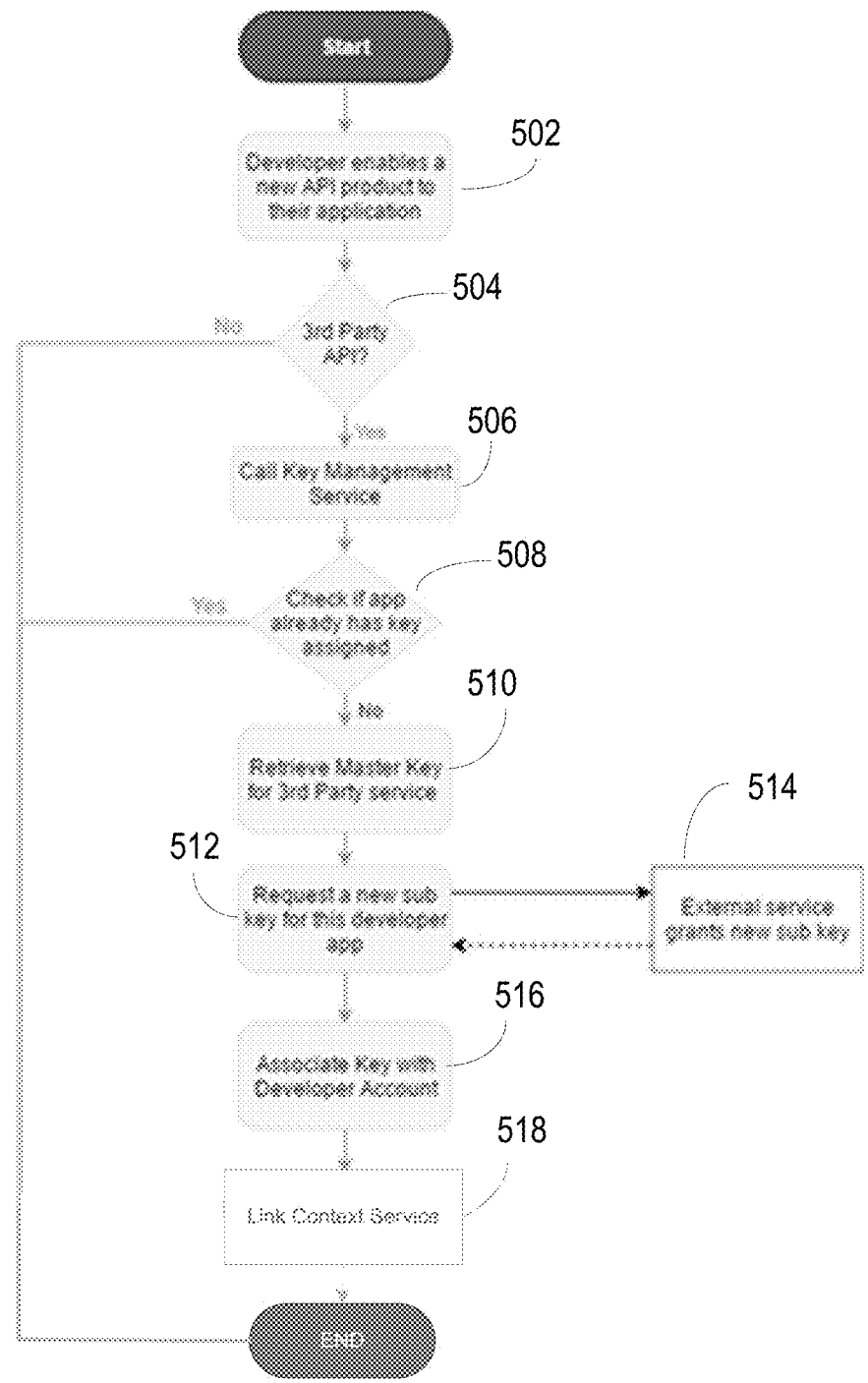
FIG. 5 is an example operation of the extensible single point orchestration system to perform key management.

FIG. 5 is an example operation of the extensible single point orchestration system to perform key management. In the example operation of FIG. 5 a new API key for an application may be first added using the extensible single point orchestration system 100 as described with reference to FIGS. 1-3. A developer may enable a third party external API 212 to operate with an application 136 being developed for use with the system. (502) For example, a developer may wish to newly associate a map location API of a mapping provider service 124 with a banking application (application 136) being developed by the developer. The developer services portal 108 may determine that an external API 212 (map location API) is being newly associated with the application 136 (developer's banking application). (504) The key management service 318 may be called by the developer services portal 108 when the new association is recognized, such as when an API proxy 206 is added to the API gateway platform 110. (506) The key management service 318 may determine if the developer of the application 136 (developer's banking application) already has a key assigned within the system 100 for the external API 212 (map location API). (508) If not, the key management service 318 may retrieve a master key from storage in the system 100. (510) The master key may be a public key associated with a master account of the system 100 that was previously established with the third party provider services 104 (mapping provider services 124) to enable access to the external API 212 (map location API).

Using the master key, the key management service 318 may request a new sub-key from the third party provider service 104 on behalf of the developer. (512) The third party provider service 104 may grant and provide the new sub-key. (512) The new sub-key may be associated with the master account of the system 100 via the master key and with an account of the developer in the system 100. (516) In addition, context services 320 may be linked to the newly added API proxy 206. (518) The newly added API proxy 206 may receive service call messages containing the developer's developer key 321 from the application, and the linked context services 320 may identify the service type as key management services, and call the key management service 314. Thus, the developer does not need to establish a new account or API key with the third party provider service 104. Instead, the key management service 318 transparently and automatically provides the developer with a new account for the new external API 212, and a new API key (new sub-key), which is seamlessly associated with the application 136 being developed and the developer's account in the system 100. In this way, the system 100, via the master key, effectively acts as the user of the service provided by the external API 212 of the third party provider service 104.

The key management service 314 may also include API key storage 318 for developers with applications 100 that use the system 100. The API key storage 318 may include storage, maintenance and verification of registration information. The registration information may include a stored record of the API sub-keys associated with a corresponding API master key, the developers, respective external APIs and respective applications to which the sub-keys are assigned. In addition, terms and conditions for use of the external APIs may be provided to the developers by the key management services 314. Accordingly, developers with applications using the system do not have to manage a number of different API keys, passwords, and other secrets associated with different external APIs to which service calls are made by the system on behalf of the developer's application. Instead, the keys are transparently managed by the system and automatically associated with the developer's account, a respective application, and a respective external API of a third party provider service.

Note that the key management service 314 is not used for authentication of users or user accounts, such as bank accounts, etc., who use the application 316. User authentication and verification for access to a user's personal information stored at a third party provider service 104 is the responsibility of communication between the user and the third party provider service 104. The system 100 may include verification of the user, such as via a token or other security identify provided by the third party provider service as part of the authentication/verification that occurs outside the system 100.

The system 100, and more specifically the key management service 314 provides implementation and management of keys on behalf of developers and developer's applications for external APIs 212 used by the developer's application 136. In this way, any time applications 136 are newly associated with an external API 212 of a third party provider service 104 using the developer services portal 108, the operations illustrated in FIG. 5 may occur. After a new third party API key (sub-key) has been automatically set up and associated with a developer's application 136 for a third party API 212, the key management service 314 may automatically use that key for all requests from the application passed through to that third party API.

Referring again to FIG. 4, when the service type indication is identified as key management services 314 (440), the key management service 314 may determine if a third party key is required for the external API being called by the API gateway platform 110. (442) If an API key is needed for the proxy service, the key management service 318 may access the API key storage to identify and retrieve the sub-key associated with the application and the developer of the application. (444) The key management service 318 may inject the sub-key into the API service call message from the API gateway platform 110. (446)

The key management service 314 may retrieve the URL protocol for the API service call message from the API gateway platform 110, and make the API service call to the external API 212. (448) The key management service 314 may retrieve the URL for the API service call message from the API gateway platform 110, and make the service call directly to the external API 212 without injection of the sub-key where a third party API key is not required in order to call the third party API. The key management service 314 may proxy the response from the external API 212 of the third party provider service 104 to the API gateway platform 110 for delivery of the response to the caller. (450)

The configuration lookup service 324 may provide a single repository in the data store 326 for different information required by different services to be stored, retrieved from and shared easily. Thus, storage of the API key storage 318 accessed by the key management services 314 may be stored in the data store 326 as well as the configuration entities 328, and any other information related to operation of the system 100. The use of configuration entities 328, such as descriptive, rich, document based (JSON) configuration entities may also allow for easy maintenance and additions. The configuration lookup service 324 abstracts the need for the other services to understand or care about how the configuration is structured or located as well as providing the ability to validate configuration entities of different types at creation time, ensuring that the configuration in the system can be relied on.

The system is impactful for any company looking to create connected, API-enabled experiences. Customers are demanding connected experiences throughout the customer journeys, seamlessly switching between APIs provided by a broad number of different third party organisations. Currently, creating these services requires a significant complexity and development overhead, that it is now possible to nullify using the extensible single point orchestration system 100.

Figure 6:
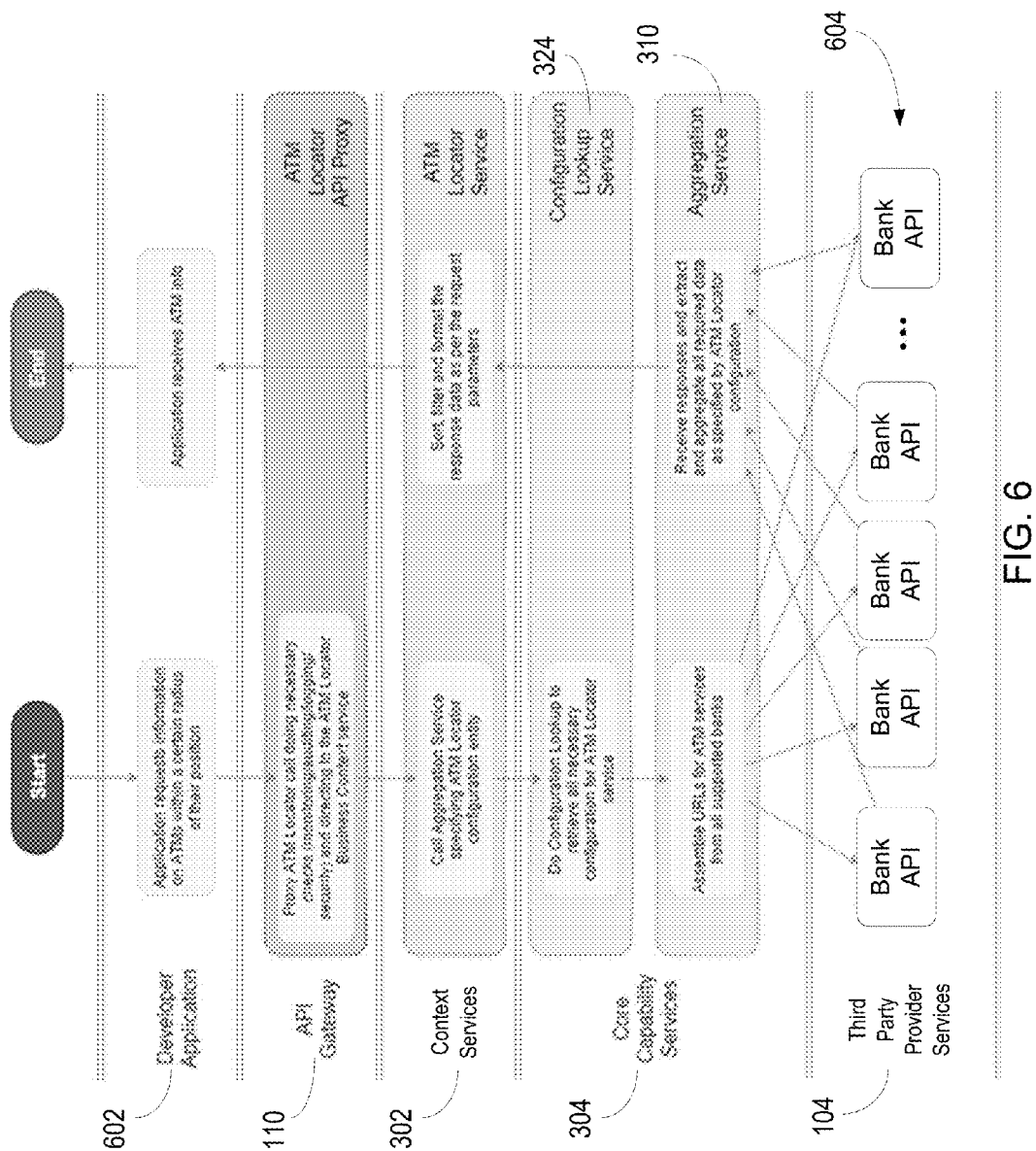
FIG. 6 is an example of operation of the extensible single point orchestration system in the application of aggregating responses from multiple service providers.

FIG. 6 is an example block diagram illustrating an example of operation of the extensible single point orchestration system 100 in the application of aggregating responses from multiple service providers. In the example of FIG. 6, the system 100 is used with an application 602 configured for calling a plurality of external APIs of third party provider services. In the example of FIG. 6, the third party providers of services 104 associated with the application 604 provide external APIs 212 that indicate locations of automated teller machines (ATMs) to the application 604. The application 602 (ATM Locator) may receive a user input for a request for ATMs within a user specified radius. Other parameters included in the user input, or available at the time of user input, and used by the system may include, for example, a location from which the user request was made, the time of day, or any other relevant information to locating a nearby ATM. The application 602, in response to the user input, may use the parameters(s) as input parameters to generate a service request.

The service request generated by the application 602 may be provided to the API Gateway 110, which may proxy the "ATM Locator" API service call, confirm the identity of the user and perform related monitoring, auditing, logging and security before selecting a context service from the context service layer 302 to handle the service request. For example, the application 602 may pass a system API key to the API gateway 110 as verification and authentication for use of the system 100. The system API key may be a developer API key uniquely assigned to the developer of the application 602. Identity confirmation of the user may include security keys, API keys, login credentials or any other form of authentication.

The API gateway 110 may select a context service from the services context layer 302, such as the first context service 320A, to process the information provided from the API gateway 110. The first context service 320A may, based on the analysis, provide an identifier of one of a plurality of stored configuration entities, a plurality of parameters, and a service type indication, such as an aggregation service type, a selection service type and/or a key management service type to the core capability services layer 304. In this example, the context service 320A chose the aggregation service type since the service request from the application 602 was determined by the first context service 320A as being targeted to a plurality of external APIs 212.

The first context service 320A may call the first core capability service 308A, since in this example, the service type indication is the aggregation service 310. The aggregation service 310 may use the configuration lookup service 324 to extract the stored configuration entity 328 identified by the first context service 320A. In this example, the identifier is a reference to configuration entity, which is "ATM locator configuration". The aggregation service 310 may use the "ATM locator configuration" to dynamically adapt the otherwise generic first core capability service 308A so as to set a respective appropriate message format for a parallel data transmission of service call messages to each of the respective identified plurality of third party provider services 104. In addition, the aggregation service 310 communicates respective API service call messages in a respective predefined format to each of a plurality of bank APIs 604 listed in the "ATM locator configuration." The service call messages may be transmitted to respective external bank APIs 604 of each of the third party provider services 104 in the respective appropriate message format. The appropriate message format is compatible with the respective external APIs 604 of each of the third party provider services.

The aggregation service 310 may receive responses from each of the bank APIs 604 and extract data as specified in the "ATM locator configuration." The first context service 320A may sort, filter, and/or format the response data to a predefined form according to the request parameters provided to the API Gateway 110 by the calling developer application. In addition, the responses from each of the external bank APIs 604 of each of the third party provider services 104 may be aggregated by the aggregation service 310 according to the configuration values extracted from "ATM locator configuration". The final aggregated response data in the predefined form may be provided via the API Gateway 110 to the developer application 602.

Figure 7:
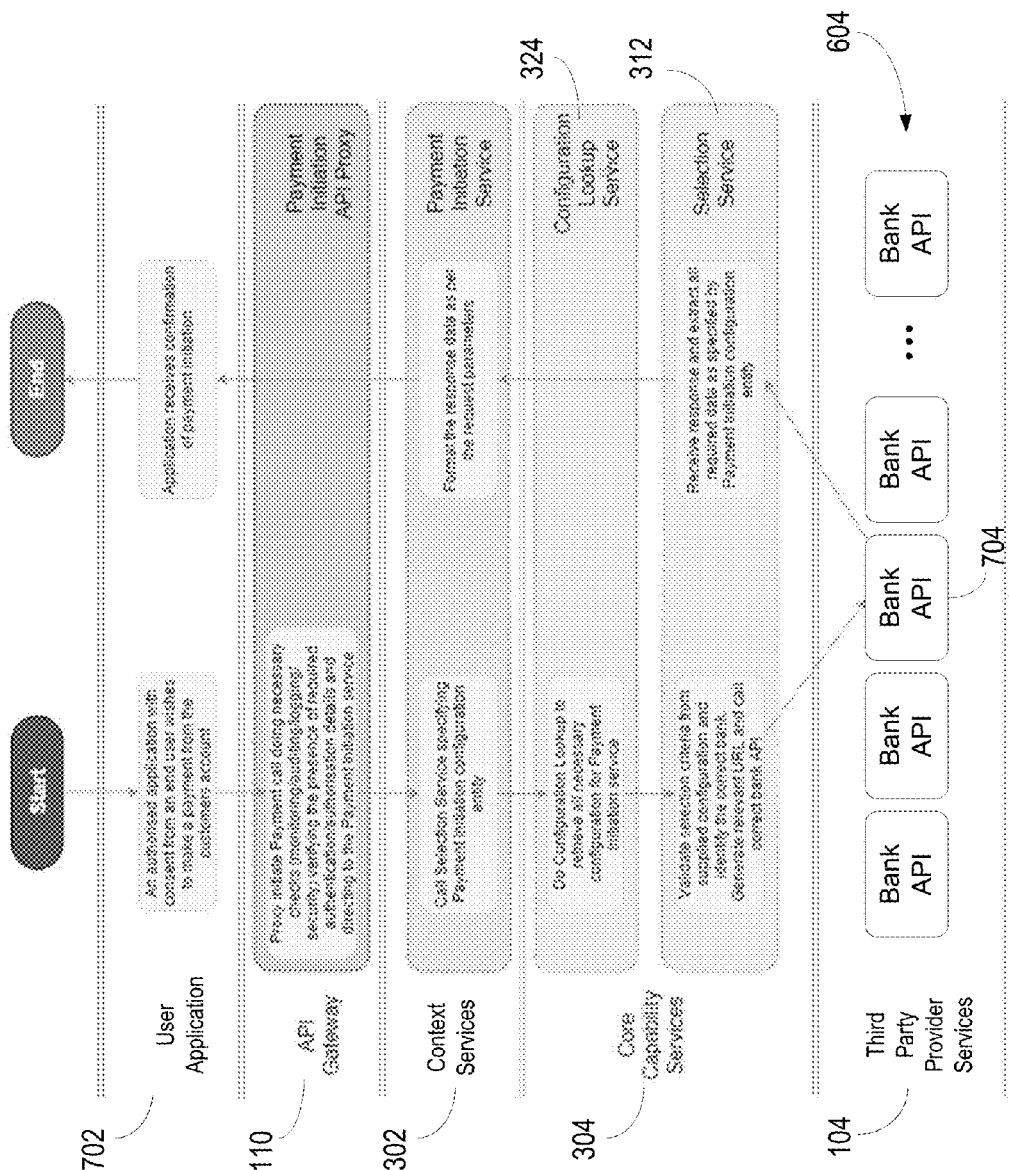
FIG. 7 is an example of operation of extensible single point orchestration system in the application of a user initiating a payment transaction targeted at one specific service provider.

FIG. 7 is an example of operation of the extensible single point orchestration system in the application of a user initiating a payment transaction targeted at one specific service provider via an application. In the example of FIG. 7, a user is using an application 702 to initiate a financial transaction in the form of a payment from a user's bank account. In other examples, other types of types of transactions may be initiated by a user via an application using the extensible single point orchestration system.

The application 702 being directed by an authorized user may receive a user input request from the user to make a payment from a customer account of the user, such as a bank account. The API gateway 110 receives a service request from the application 702. Parameters included in the request may include identification of the user, identification of the customer account, identification of the bank or other financial institution from which the payment is being requested, a requested payment date and/or any other information related to the payment request.

The API Gateway 110 may proxy the "initiate payment" API service call with an API proxy, confirm the identity of the user and perform related monitoring, auditing, logging and security before selecting a context service 320 from the services context layer 302 to handle the request. Such identity confirmation may include security keys, API keys, login credentials, tokens, or any other form of authentication. For example, the application 702 may pass a system API key to the API gateway 110 as verification and authentication for use of the system 100.

The selected context service 320, such as the third context service 320C, may provide an identifier of one of a plurality of stored configuration entities, a plurality of parameters, and a service type indication of a selection service type to a core capability service 308A-D in the core services layer 304, since the service request in this example is targeted to a single external API of a single third party provider service out of a plurality of similar services provided by third party provider services. In addition, the context service 320C may specify as one or more parameters the third party provider service from which the payment is being initiated by the service request which may be used to determine the correct third party provider service to target.

The core capability services 304 may call the selection service 312. The selection service 312 may use the configuration lookup service 324 to extract the stored configuration entity 328. In this example, the identifier is a name of the stored configuration datafile, which is "Payment initiation configuration" datafile. The selection service 312 may use the stored "Payment initiation configuration" entity to dynamically adapt the otherwise generic selection service 312 so as to set an appropriate message format for a data transmission. In addition, the selection service 312 may transmit a service call message to an external API 704 of the identified single third party provider service 104 in the appropriate message format. The appropriate message format will be compatible with the external API 704 of the identified single third party provider 104 due to the dynamic adaptation of the selection service 312 using the stored configuration entity identified as "Payment initiation configuration". The external API 704 may be chosen from among a plurality of available bank APIs 604 based on the parameters included in the service request.

The selection service 312 may receive a response from the external API 704 and extract data as specified in the stored "Payment initiation configuration" datafile. The third context service 320C may sort, filter, and/or format the response data to a predefined form according to the request parameters provided by the API Gateway 110. The data in the predefined form is provided via the API Gateway 110 to the application 702.

Figure 8:
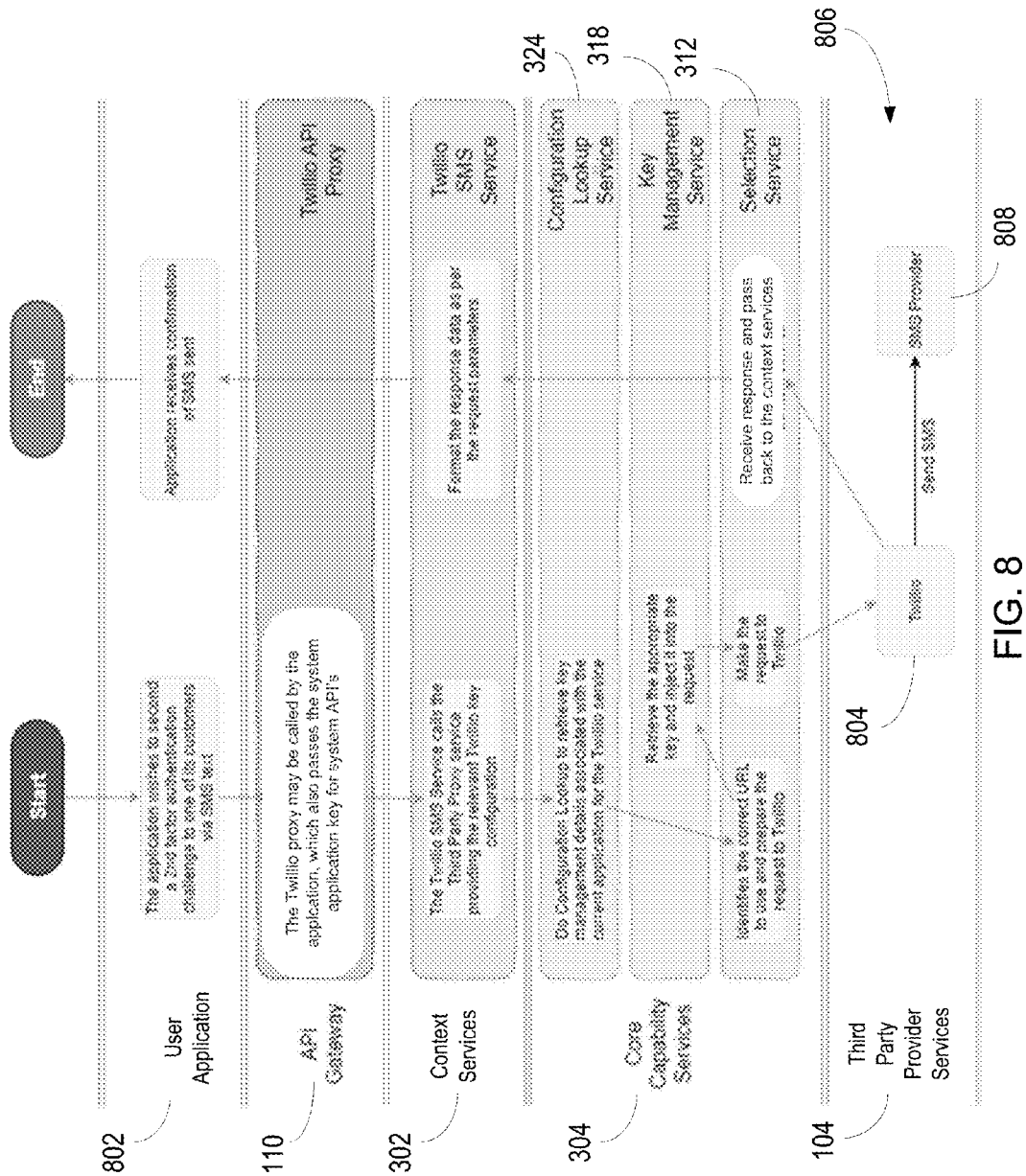
FIG. 8 is an example of operation of extensible single point orchestration system in the application of key management services accessing a 3rd party communication service.

FIG. 8 is an example of operation of the extensible single point orchestration system in the application of key management services accessing a 3rd party communication service. Key management services may be initiated by the system when the API gateway 110 is provided with an API services call message by a application 802, instead of the application providing a service request message, which would initiate either the aggregation service 310 or the selection service 312. Since the application already knows the specific external API to which the call is directed, and has identified the specific external API with an API services call message, key management services may be initiated in the system. However, if the external API requires an API key in order to respond to the API services call message, the key management service 318 may be used to supply an appropriate sub-key to avoid the user being forced to manage and apply the proper API key for the target external API. Without the appropriate API key being included with the API service call message, the external API will not respond.

In the example of FIG. 8, the example communication service described is operation of an SMS service via an external API provided by a third party provider service 104. In this example, the third party provider service is Twillio, providing a Twillio external API 804 as one of a plurality of available services 806. Also in this example, an SMS text response to a second of a two factor authentication challenge is desired, and the user, via the application 802, has provided request message requesting issuance of an SMS via the Twillio API as part of a two factor authentication. In other examples, other types of communication services may be initiated by an application/user by.

The application 802 being directed by an authorized user may receive as a user input a request from the user. The API gateway 110 receives a service call message from the application. Parameters included in the service call message may include a developer API key, a URL of the external API 804 and other variants and parameter values being passed as part of the service call. In this example, the parameters may include identification of the SMS provider to which the SMS text should be directed (instead of, or in addition to, the URL of the external API 804), and the information for the $2^{nd}$ factor authentication.

At the API Gateway 110, the "Twillio" proxy is called by the application 802 in accordance with the user input. The application 802 may also pass a system API key or developer API key to the API gateway 110 as part of the service call message. The selected context service 320, such as the fourth context service 320D, may provide to one of the core capability services in the core services layer 304 an identifier or indicator of the storage location in the API key storage 318 of key management details for the application 802, a plurality of parameters, and a service type indication of a selection service type and a key management service type, since the application 802 is for a specific external API, which requires an API key.

One or more of the core capability services 308 within the core services layer 304, for example, the second core capability service 308B may be adapted with a configuration entity to perform as a selection service for the specific application and the third core capability service 308C may be adapted to perform as a key management service for the specific application. In other examples, one of the core capability services, such as the core capability service 308C may provide the functionality of multiple services, such as both the selection services 312 and the key management services 314. The key management service may call the configuration lookup service 324 to access the data store based on the identifier or indicator of the storage location of the key management details for the application 802. Within the API key storage, which may be stored in the data store, is the key management details. The key management details may include the sub-key. The sub-key may be stored in association with the application 802 and the external API (Twillio API) 804. The sub-key was automatically obtained by the system 100 on behalf of the developer from the third party provider service at the time API proxy for the Twillio API was newly associated with the application 802 by the developer. (see FIG. 5 and related discussion) The second core capability service 308B, which in this example, is the selection service 312 may identify the URL for the API service call message from parameters provided from the application 802. The key management services 314 may retrieve the sub-key based on the stored association between the sub-key and the application 802. The key management services 314 may then dynamically inject the sub-key into the API service call message by replacing the developer API key provided by the application in the service request. The selection service 312 may then proxy the API service call message with the injected sub-key to the external API 804 of the third party provider service 104, which in this example is the Twillio API 804.

Upon receipt of the API service call message, which includes the sub-key injected by the key management service 318, the Twillio API 804 may generate and send an SMS text message. The SMS text message may be directed to an SMS provider 808 identified with the parameters, and include the 2nd factor authentication information included among the parameters provided by the API gateway 110.

The selection service 312 may receive a response from the external API 804. In this example, the response from the Twillio external API 804 may be an indication that the SMS text message had been sent. Data may be extracted from the response and passed to the third context service 320C. The third context service 320C may sort, filter, and/or format the response data to a predefined form according to parameters provided to the API Gateway 110. The data in the predefined form is provided via the API Gateway 110 to the application 802 to indicate that the SMS message had been sent.

In other examples, many other applications of the extensible single point orchestration system for application program interfaces (APIs) are possible.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, documents and implicit storage mechanisms. Instructions may form parts (e.g., subroutines or other code sections) of a single program, may form multiple separate programs, may be distributed across multiple memories and processors, and may be implemented in many different ways. Example implementations include standalone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

To clarify the use of and to hereby provide notice to the public, the phrases "at least one of <A>, <B>, . . . and <N>" or "at least one of <A>, <B>, <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. In addition, as used in the claims, the article "a" should be construed as interchangeable with "at least one."

While various embodiments have been described, it will be apparent to those of ordinary skill in the art that many more embodiments and implementations are possible. Accordingly, the embodiments described herein are examples, not the only possible embodiments and implementations.

We claim:

1. A method of performing extensible single point orchestration for application program interfaces (APIs) comprising:
    receiving one of a plurality of possible service requests from an application;
    identifying a single third party provider service or a plurality of third party provider services;
    retrieving a stored configuration entity;
    dynamically adapting a core capability service, using the stored configuration entity, the dynamically adapting to:
        set an appropriate message format for data transmission of a service call message, or
        set a respective appropriate message format for a parallel data transmission of service call messages to each of the respective identified plurality of third party provider services;
    transmitting the service call message to an external API of the identified single third party provider service in the appropriate message format when the stored configuration entity is dynamically adapted to set the appropriate format for data transmission, the appropriate message format being compatible with the external API of the identified single third party provider service; and
    transmitting the service call messages to respective external APIs of each of the third party provider services in the respective appropriate message format when the stored configuration entity is dynamically adapted to set the appropriate format for parallel data transmission of service call messages, the respective appropriate message format being compatible with the respective external APIs of each of the third party provider services.

2. The method of claim 1, further comprising:
    receiving a response from the external API of the identified single third party provider service or from the respective external APIs of each of the third party provider services;
    filtering results included in the response; and
    outputting the filtered results for receipt by the application.

3. The method of claim 2, further comprising aggregating responses received from the respective external APIs of each of the third party provider services.

4. The method of claim 1, wherein dynamically adapting the core capability service comprises:
adapting the core capability service with a first stored configuration entity used to dynamically adapt the core capability service so as to set an appropriate message format for a data transmission with the core capability service to the identified single third party provider service, or
adapting the core capability service with a second stored configuration entity used to dynamically adapt the core capability service so as to set a respective appropriate message format for a parallel data transmission with the core capability service to each of the respective identified plurality of third party provider services.

5. The method of claim 4, wherein dynamically adapting the core capability service comprises:
dynamically adapting the core capability service to a selection service using the first stored configuration entity; and
dynamically adapting the core capability service to an aggregation service using the second stored configuration entity.

6. The method of claim 1, wherein dynamically adapting the core capability service comprises:
identifying the single third party provider service or the plurality of third party provider services in accordance with selection of a service type.

7. A non-transitory computer readable medium that includes instructions executable by a processor, the instructions comprising:
instructions to receive a service request from an application, the service request being one of a plurality of possible service requests;
instructions to identify a single third party provider service or a plurality of third party provider services based upon a type of the service request;
instructions to access a stored configuration entity in based on the service request;
instructions to dynamically adapt a core capability service with the stored configuration entity to be only one of:
a selection service type that generates an appropriate message format for a data transmission for the single third party provider service, or
an aggregation service type that generates a respective appropriate message format for a parallel data transmission to each of the respective identified plurality of third party provider services;
instructions to transmit, with the core capability service adapted to be the selection service type, a service call message to an external application program interface (API) of the identified single third party provider service in the appropriate message format when the appropriate message format is compatible with the external API of the identified single third party provider service; and
instructions to transmit, with the core capability service adapted to be the aggregation service type, the service call message to respective external APIs of each of the third party provider services in the respective appropriate message format when the appropriate message format is compatible with the respective external APIs of each of the third party provider services.

8. The computer readable medium of claim 7, further comprising instructions to:
receive, in addition to the one of the plurality of possible service requests, an indication of the type of the service request, an identifier of the stored configuration entity, and a plurality of parameters included in the service request.

9. The computer readable medium of claim 7, wherein the instruction to receive comprising instructions to select an API proxy of an API gateway based on the service request and instructions to identify the type of the service request as one of the aggregation service type for use with the plurality of third party provider services or the selection service type for use with the single third party provider service, the stored configuration entity retrieved based on the identified type of the service request.

10. The computer readable medium of claim 7, wherein the instructions to dynamically adapt the core capability service comprises instructions to dynamically adapt a first core capability service using the stored configuration entity to be the selection service type and instructions to dynamically adapt a second core capability service using the stored configuration entity to be the aggregation service type, the stored configuration entity used to adapt the first core capability service being different than the stored configuration entity used to adapt the second core capability service.

11. The computer readable medium of claim 7, further comprising:
instructions to receive a response to the service call message from the external API of the identified single third party provider or receive a plurality of respective responses from the respective external APIs of each of the third party provider services; and
instructions to format the response or the plurality of respective responses based on a mapping included in the stored configuration entity.

12. The computer readable medium of claim 11, wherein the instructions to format the response or the plurality of respective responses comprise:
instructions to extract data from the plurality of respective responses and aggregate the extracted data into a consolidated single response.

13. An extensible single point orchestration system for application program interfaces (APIs) comprising:
a processor configured to:
generate, based on a service request to an API proxy:
an identifier of one of a plurality of stored configuration entities,
a plurality of parameters, and
a service type indication comprising:
an aggregation service type or a selection service type;
apply a first stored configuration entity identified with the identifier to a first core capability service, when the service type indication is indicated as being the aggregation service type,
the first stored configuration entity applied to dynamically adapt the first core capability service to be executable with the processor to generate each of a plurality of different API specific service call messages in each of a plurality of different formats, each of the plurality of different API specific call messages containing at least some of the parameters, and the first core capability service, as adapted by the first stored configuration entity, executed by the processor to communicate respective different API specific service call messages to each of a plurality of different APIs of a plurality of different external third party provider services; and apply a second stored configuration entity identified with the identifier to a second core capability service when the service type indication is the selection service type, the second stored configuration entity applied to dynamically adapt the second core capability service to generate an API specific service call message containing at least some of the parameters, and the second core capability service, as adapted by the second stored configuration entity, executed by the processor to communicate the API specific service call message to one API of only one of the plurality of different external third party provider services.

14. The extensible single point orchestration system of claim 13, wherein the processor is further configured to:
execute the second core capability service, as adapted by the second stored configuration entity, to transform inputs received from the only one of the plurality of different external third party provider services into response data.

15. The extensible single point orchestration system of claim 14,
wherein the processor is further configured to:
execute the second core capability service, as adapted by the second stored configuration entity, to format the response data; and
provide the formatted response data for receipt by an application as a response to the service request.

16. The extensible single point orchestration system of claim 13, the processor further configured to:
execute the first core capability service, as adapted by the first stored configuration entity, to transform and aggregate inputs from a plurality of different call responses as response data.

17. The extensible single point orchestration system of claim 13, wherein the processor is further configured to:
execute a configuration lookup service to identify the first stored configuration entity or the second stored configuration entity from a data store based on the identifier.

18. The extensible single point orchestration system of claim 13, wherein the first core capability service and the second core capability service each comprise independent micro services.

19. The extensible single point orchestration system of claim 13, wherein the first core capability service is a first generic service until dynamically adapted with the first stored configuration entity to generate the plurality of different API specific service call messages, and the second core capability service is a second generic service until dynamically adapted with the second stored configuration entity to generate the API specific service call message.

20. The extensible single point orchestration system of claim 13, wherein the API proxy is configured to allocate the service request to one of a plurality of available context services in response to being called due to receipt by an API gateway of the service request from an application executed by a user, the one of the plurality of available context services linked to the API proxy.

* * * * *